United States Patent [19]
Michalczyk

[11] Patent Number: 5,270,429
[45] Date of Patent: Dec. 14, 1993

[54] SILICON CARBIDE PRECURSORS AND THEIR PREPARATION AND USE

[75] Inventor: Michael J. Michalczyk, Wilmington, Del.

[73] Assignee: E. I. du Pont de Nemours and Company, Wilmington, Del.

[21] Appl. No.: 862,109

[22] Filed: Apr. 2, 1992

[51] Int. Cl.$^5$ .............................................. C08G 77/24
[52] U.S. Cl. .......................................... 528/42; 528/10
[58] Field of Search ................................ 528/42, 10

[56] References Cited

U.S. PATENT DOCUMENTS

| | | | |
|---|---|---|---|
| 4,472,591 | 9/1984 | Schilling, Jr. et al. | 528/14 |
| 4,590,253 | 5/1986 | Hasegawa et al. | 528/33 |
| 4,761,458 | 8/1988 | Burns et al. | 528/31 |

FOREIGN PATENT DOCUMENTS 139257 9/1984 European Pat. Off. .

OTHER PUBLICATIONS

C. L. Czejak et al., *J. Am. Ceram. Soc.*, 73, 352 (1990).
C. L. Schilling et al., *Am. Ceram. Soc. Bull.*, 62, 912 (1983).
S. Yajima, *Am. Ceram. Soc. Bull.*, 62, 893 (1983).
D. J. Carlsson et al., *J. Am. Ceram. Soc.*, 73, 237 (1990).

*Primary Examiner*—Melvyn I. Marquis

[57] ABSTRACT

(Dichloromethyl)methyldichlorosilane is reacted in the presence of Mg, K, Na or Li to form chloropolycarbosilanes which in turn can be reacted with a reducing agent to form polycarbosilane polymers that have utility as precursors to silicon carbide ceramics.

14 Claims, No Drawings

SILICON CARBIDE PRECURSORS AND THEIR PREPARATION AND USE

FIELD OF THE INVENTION

This invention relates to chloropolycarbosilanes, polycarbosilanes, their preparation, and their use for preparing silicon carbides.

BACKGROUND OF THE INVENTION

The most commonly used polycarbosilane precursor to silicon carbide ceramics is "Nicalon", manufactured by the Nippon Carbon Company. (See S. Yajima, Am. Ceram. Soc. Bul., 62,893 (1982)). "Nicalon" is based on polydimethylsilane $[Si(CH_3)_2]_n$, a polymer which has a silicon to carbon ratio (Si:C) of 1:2. In order to manufacture ceramic fibers from a ceramic precursor, it must retain its shape during firing. However, to accomplish this with "Nicalon", firing must be carried out in the presence of oxygen which stabilizes the "Nicalon" preceramic.

Silicon carbide ceramics are of growing technical and commercial import because of their use in high technology products. Thus, precursors to silicon carbide and processes for their preparation offer fruitful areas for research. In particular, novel highly crosslinked precursors for ceramic fibers that lead to pure silicon carbide, SiC, and do not need oxygen curing are of great commercial interest.

SUMMARY OF THE INVENTION

A process is provided in accordance with this invention for preparing a crosslinked chloropolycarbosilane. The process comprises the step of reacting $Cl_2Si(CH_3)CHCl_2$ with a metal selected from the group consisting of Mg, K, Na, and Li in a solvent selected from the group consisting of toluene, xylene, and high boiling ethers at a temperature from about 50° C. to reflux of said solvent. The invention also provides novel chloropolycarbosilanes prepared by said process.

This invention further provides a process for preparing a crosslinked polycarbosilane which comprises the steps of preparing a crosslinked chloropolycarbosilane as above, and reacting the chloropolycarbosilane with a reducing agent at a temperature from −10° C. to 25° C. The invention also provides novel polycarbosilanes prepared by said process.

This invention further provides a process for preparing a silicon carbide which comprises the steps of preparing a crosslinked polycarbosilane as above, and pyrolyzing said polycarbosilane.

Crosslinked chloropolycarbosilanes are provided in accordance with this invention which contain units of the formula

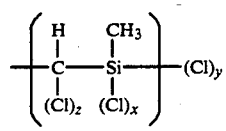

wherein x, y, and z represent the proportion of bonds occupied by Cl, $0 \leq x < 1$, $0 \leq y < 1$, and $0 \leq z < 0.4$.

Crosslinked polycarbosilanes are provided in accordance with this invention which contain units of the formula

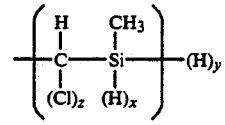

wherein x and y represent the proportion of bonds occupied by H, z represents the proportion of bonds occupied by Cl, $0 \leq x < 1$, $0 \leq y < 1$, and $0 \leq z < 0.4$.

DETAILED DESCRIPTION OF THE INVENTION

This invention provides for the reaction of $Cl_2Si(CH_3)CHCl_2$ with Mg, K, Na, and Li in a suitable high boiling solvent to yield a crosslinked chloropolycarbosilane. The solvent should boil at about 50° C. or higher. Suitable solvents include toluene, xylene, and high boiling ethers. Suitable ethers include cyclic and noncyclic compounds which boil at about 50° C. or higher. The reaction is conducted at a temperature of from 50° C. to the solvent reflux temperature.

Reactions involving sodium can lead to degradation of various ethers (e.g., tetrahydrofuran) and incorporation of their byproducts into the polymer product, and it is preferred to use toluene or xylene as the solvent for reaction where $Cl_2Si(CH_3)CHCl_2$ is reacted with Na. Preferred reaction systems involve refluxing $Cl_2Si(CH_3)CHCl_2$ with magnesium in tetrahydrofuran, and refluxing $Cl_2Si(CH_3)CHCl_2$ with sodium in toluene. In reactions involving Mg in tetrahydrofuran, some cleavage of the solvent may be observed (generally about 3%, or less) and this can result in the incorporation of minor amounts of oxygen in the chloropolycarbosilane product.

The form of the metal used is not considered crucial. Magnesium employed in the reaction may be standard reagent quality or "activated". Normally from two to four moles of magnesium per mole of silane are employed. Lithium, sodium and potassium may be used in the form of ribbon, chunks, and/or dispersions. Normally at least about four moles of K, Na or Li is used per mole of silane.

The order of the addition, either silane to metal suspended in solvent or the reverse, is not critical. In the case of metal added to silane, the addition is usually carried out over about 2 to 3 hours, but this time is not critical. Metal addition is followed by a 2 to 3 hour reaction period at elevated temperatures—the reflux point of the solvent is convenient—followed by, optionally, stirring at ambient temperature for from 10 to 20 hours.

The crosslinked chloropolycarbosilane products of this process are novel and are useful as further described below for the production of silicon carbide. For example, the process can be used to provide novel compounds containing units of the formula

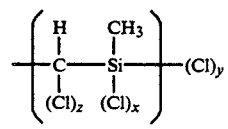

wherein x, y, and z represent the proportion of bonds occupied by Cl (the remainder representing crosslinked bonds), $0 \leq x < 1$, $0 \leq y < 1$, and $0 \leq z < 0.4$. Typically, z is 0.2 or less. When $Cl_2Si(CH_3)CHCl_2$ is essentially the only starting material reacted with Mg, K, Na and/or Li, the chloropolycarbosilane may consist essentially of these units. It is noted that vinylchlorosilanes such as $(CH_3)(CH_2=CH)SiCl_2$ may be added to the reaction mixture to further enhance thermal crosslinking properties. In any case, the number average molecular weight of the chloropolycarbosilane (as calculated from the corresponding polycarbosilane) typically ranges from about 300 to about 17,000. When sodium is used as the active metal, x, y, and z are each normally about zero, and the product is typically an insoluble powder which can be directly pyrolyzed to silicon carbide.

The chloropolycarbosilanes prepared as above, particularly those containing substantial amounts of chlorine bound to silicon (i.e., Si—Cl functionality) can be reacted to form corresponding polycarbosilanes using an appropriate reducing agent. For example, after chloropolycarbosilane formation using magnesium, reduction may be accomplished with lithium aluminum hydride (LAH). Other suitable reducing agents include lithium hydride and alkyl aluminum hydrides. The reduction can conveniently be carried out in the same reaction vessel used for chloropolycarbosilane formation. The reducing agent is usually employed in excess (from a stoichiometric amount to a 10% excess is normal). The reduction temperature is usually from about $-10°$ C. to about room temperature ($20°-25°$ C.). The preferred temperature is about $0°$ C. Should the reduction reaction mass thicken, the reaction mass may be thinned by the addition of an inert diluent such as hexane or additional solvent. Typically, yellow glassy solids are obtained in yields from about 25-100%. The polymers are generally soluble in common solvents such as hexane, tetrahydrofuran and toluene.

The crosslinked polycarbosilane products of this process are novel and as further described below, are precursors to silicon carbide. For example, the process can be used to provide novel compounds containing units of the formula

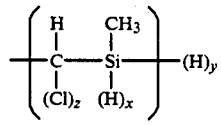

wherein x and y represent the proportion of bonds occupied by H, z represents the proportion of bonds occupied by Cl, $0 \leq x < 1$, $0 \leq y < 1$, and $0 \leq z < 0.4$. Typically, z is 0.2 or less.

Typically (as shown by Silicon-29 NMR analysis) most of the silicon in the crosslinked polycarbosilane is surrounded by four carbon atoms (i.e., x and y are low). However, some SiH and $SiH_2$ are normally observed when magnesium is used as the metal for forming the chloropolycarbosilane. For example, when magnesium is used, the silicon in the polycarbosilane is typically present as about 14% SiH, about 5% $SiH_2$ and about 81% with no hydrogen attached. GPC analysis of these polycarbosilanes normally shows a broad bimodal distribution (e.g., Mn=1700, Mw=9500 with a polydispersity of 5.5). These polymers typically have a number average molecular weight within the range from about 250 to 17,000, and contain about 7-8% by weight residual chlorine. Typically these polymers do not melt below $360°$ C.; but DSC analysis of the polymer under nitrogen gives two exothermic transitions: at about $240°-265°$ C. and at about $370°-385°$ C. In air, a third exothermic transition is observed at about $449°$ C.

Generally the reaction of $Cl_2Si(CH_3)CHCl_2$ with magnesium in accordance with this invention, and subsequent reduction of the reaction product yields a highly crosslinked polycarbosilane which remains soluble. It is considered unusual to obtain high molecular weight material using magnesium metal and production of higher weight materials in accordance with this invention may be due to crosslinking at the two reactive $CHCl_2$ sites. It is noted that the chloropolycarbosilane may also be reacted with water (rather than a reducing agent) to give unique polyoxocarbosilane products which are precursors of silicon oxycarbides.

The polycarbosilanes obtained by reducing chloropolycarbosilanes having substantial Si—Cl functionality, can be pyrolyzed under argon to product black ceramics. The following pyrolysis condition can be employed. For pyrolysis at $1000°$ C., increase the temperature from room temperature (i.e. about $25°$ C.) to $1000°$ C. at $5°$ C./min, hold the temperature at $1000°$ C. for about 1 hour, and cool to room temperature (e.g. at $5°$ C./hr). Weight loss normally occurs in two steps during the heating process, between about $150°$ C. and $300°$ C., and between about $400°$ C. and $550°$ C. It is preferred to avoid oxygen curing of the polycarbosilane.

When magnesium is used as the metal for preparing the chloropolycarbosilane intermediates, ceramic yields upon the pyrolysis of the polycarbosilanes derived therefrom, typically range from about 55 to 63% (TGA analysis from $25°$ C. to $950°$ C. with a $10°$ C./min ramp has indicated similar yields). Curing of the polycarbosilanes under argon during the pyrolysis process (e.g. at $200°$ C., $250°$ C. or $370°$ C.) can increase the ceramic yield slightly. Fibers of these polycarbosilanes (i.e., where magnesium is used to prepare the chloropolycarbosilane intermediate) can be pulled from hexane or toluene solution. Normally such fibers retain shape when pyrolyzed under argon to $1000°$ C. (without oxygen curing).

When sodium is used as the metal for preparing the intermediate polymers, an insoluble polycarbosilane is normally produced. These polymers can be characterized as highly crosslinked mixed polysilane/polycarbosilane systems. Ceramic yields upon pyrolysis of these polymers typically range from about 68 to 79%. The use of potassium as the metal for preparing the intermediate polymers is considered to provide silimar results. When lithium is used as the metal for producing the intermediate polmers a yellow liquid polymer is generally obtained. Pyrolysis of this polymer under argon typically provides a ceramic yield of about 40%.

Practice of the invention will become further apparent from the following non-limiting Examples.

EXAMPLES

Reactions were carried out in dried equipment under an argon atmosphere. Impure (dichloromethyl)methyldichlorosilane (i.e., $Cl_2Si(CH_3)CHCl_2$) was obtained from a Du Pont manufacturing process and purified by distillation. Toluene was reagent grade and purified by distillation from lithium aluminum hydride before use. Tetrahydrofuran was spectrophotometric grade (EM Science) and purified by distillation from sodium/benzophenone before use. The magnesium employed was obtained from Aldrich as "99.5% activated chips". Hexane was spectrophotometric grade from EM Science. Lithium aluminum hydride was "95+%" from Aldrich. Sodium was obtained from J. T. Baker, Inc. and cut into roughly 1 cm cubes before use. Sodium dispersion was obtained from Aldrich (40% by weight in mineral spirits). Proton NMR spectra were determined in deuterochloroform solvent on a GE model QE-300 instrument. Silicon-29 NMR were determined in deuterochloroform solvent on a GE model omega 300 instrument. Thermogravimetric analyses were performed on a Du Pont Model 951 analyzer. Elemental analyses of the ceramics were performed by Corning Incorporated.

EXAMPLE 1

Preparation of Chloropolycarbosilane

To a stirred solution of 43.0 ml (0.307 mol) of $Cl_2MeSiCHCl_2$ in 400 ml THF was added 15.62 g (0.643 mol) of dried magnesium turnings over a 1 hr period at 25° C. After the addition, the reaction was refluxed for 2 hr, and the resulting orange-brown mixture was cooled and stirred at room temperature for 16 hr.

EXAMPLE 2

Preparation of Polycarbosilane

The mixture obtained in Example 1 was cooled to 0° C. and 3.20 g of lithium aluminum hydride was added slowly. After stirring for 1 hr, the slurry was slowly quenched with 10% aqueous hydrochloric acid solution until the evolution of gas ceased. The bulk of the solids were filtered and the filtrate was extracted with hexane and washed once with saturated ammonium chloride solution, then twice with distilled water and dried over magnesium sulfate. Removal of the volatiles in vacuo left 17.8 g (104% based on $(MeSiCH)_n$) of a golden brown solid. The polymer is soluble in most common organic solvents. Analysis: Calcd for $C_2H_{4.5}SiCl_{0.11}$: C, 39.68; H, 7.49; Cl, 6.44. Found: C, 38.53; H, 7.30; Cl, 6.20. Molecular weight analysis (GPC polystyrene standard) of the polycarbosilane obtained from a similar preparation gave Mn=1700, Mw=9500, D=5.5

EXAMPLE 3

Preparation of Silicon Carbide

Pyrolysis of the solid polycarbosilane obtained in Example 2 from 25° C. to 1000° C. at 5° C./min with a 1 hr hold at 1000° C. gave a black ceramic in 56% yield. Pyrolysis of polycarbosilanes obtained in similar preparations under the same conditions gave shiny-black ceramics with yields ranging from about 55-63%. Analysis of these ceramics, obtained from polycarbosilanes similar to that in Example 2, gave ranges of SiC+0.44-0.50 C+0.21-0.26 O. Drawn fibers of the ceramic precursors using hexane as a solvent retained their shape during firing in an argon atmosphere

EXAMPLE 4

Preparation of Polysilane/Polycarbosilane

To a stirred mixture of 5.29 g (0.230 mol) of sodium chunks in 150 mL of toluene was added 7.10 mL (0.0506 mol) of $Cl_2MeSiCHCl_2$ dropwise over a period of 1 hr. The reaction was refluxed for 3 hr and the resulting purple solution was cooled to room temperature. After stirring for 16 hr, the reaction mixture and excess sodium metal were quenched with isopropanol followed by distilled water until evolution of gas ceased. The solution was washed with saturated ammonium chloride solution. Isopropanol was added to precipitate 1.04 g (37%) of polysilane/polycarbosilane as a off-white powder. The powder was insoluble after precipitation. Isolation of insoluble solids from the aqueous washings afforded another 0.428 g (15%) of the mixed polysilane/polycarbosilane polymer. Analysis: Calculated for $[(CH_3)SiCH]_n$, $C_2H_4Si$: C, 42.79; H, 7.18. Found: C, 39.95; H, 6.75 (insoluble polymer). Found C, 44.57; H, 6.99 (precipitated powder).

EXAMPLE 5

Preparation of Silicon Carbide

Pyrolysis of the precipitated powder from Example 4 from 25° C. to 1000° C. at 5° C./min with a 1 hour hold at 1000° C. gave a black ceramic in about 79% yield. Pyrolysis of the residual insoluble polymer from aqueous washings in Example 4 under the same conditions have a black ceramic in about 68% yield.

EXAMPLE 6

Preparation of Chloropolycarbosilane

A solution containing 19.56 mL (0.140 mol) of $Cl_2SiCHCl_2$ and 2.02 mL (0.015 mol) of $(CH_3)(CH_2=CH)SiCl_2$ were added dropwise over a 1 hr period to a stirred mixture of 8.31 g (0.342 mol) of magnesium metal in 150 mL of tetrahydrofuran. After the addition the brown mixture was refluxed for 16 hr and cooled to room temperature.

EXAMPLE 7

Preparation of Polycarbosilane

The mixture obtained in Example 6 was cooled to 0° C. and 4.86 g (0.128 g) of lithium aluminum hydride was slowly added. After stirring for 1 hr, the slurry was refluxed for 30 min, cooled and was slowly quenched with 10% aqueous hydrochloric acid solution until the evolution of gas ceased. The bulk of the solids were filtered and the filtrate was extracted with hexane and washed once with saturated ammomium chloride solution, then twice with distilled water and dried over magnesium sulfate. Removal of the solvent in vacuo left 2.26 g (29%) of a golden brown liquid. Proton NMR showed the polymer to be $\{[(CH_3)SiCH(H)_{1.6}]_{0.95}[(CH_3)(CH_2=CH)SiH]_{0.05}\}$. Analysis: Calculated for $C_{2.0}H_{5.7}SiCl_{0.4}$; C, 40.91; H, 8.96; Cl, 2.29. Found: C, 39.29; H, 8.60; Cl, 2.21. TGA yield (25°-1000° C. at 10°/min)=46%.

EXAMPLE 8

Preparation of Polyoxocarbosilane

To the orange brown mixture synthesized similar to that in Example 1 from 42.0 mL (0.300 mol) of $Cl_2MeSiCHCl_2$, 14.92 g (0.614 mol) of magnesium chips in 500 mL of tetrahydrofuran was added excess distilled water to quench the residual Si—Cl functionality. The polymer was extracted with hexane and washed once with saturated sodium bicarbonate solution to remove excess hydrochloric acid, twice with distilled water and dried over magnesium sulfate. Removal of the volatiles in vacuo left 17.5 g (90%) of a thick viscous yellow polymer of the formula $[(CH_3)SiCHCl_{0.056}O_{0.44}]_n$. Analysis: Calculated for $C_2H_4SiCl_{0.056}O_{0.44}$: C, 36.87; H, 6.19; Cl, 3.05. Found: C, 36.91; H, 6.18; Cl, 3.05. TGA=69% ceramic yield.

What is claimed is:

1. A process for preparing a crosslinked chloropolycarosilane comprising the step of: reacting Cl$_2$Si(CH$_3$)CHCl$_2$ with a metal selected from the group consisting of Mg, K, Na, and Li in a solvent selected from the group consisting of cyclic and non-cyclic ethers which boil at about 50° C. or higher, toluene and xylene, at a temperature from about 50° C. to reflux of said solvent.

2. The process of claim 1 wherein the crosslinked chloropolycarbosilane contains units of the formula

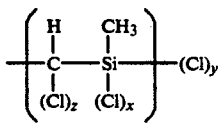

wherein x, y, and z represent the proportion of bonds occupied by Cl, $0 \leq x < 1$, $0 \leq y < 1$, and $0 \leq z < 0.4$.

3. The process of claim 2 wherein the metal is Mg and the solvent is tetrahydrofuran.

4. The process of claim 2 wherein the metal is Na, the solvent is toluene, and x, y, and z are each about zero.

5. A crosslinked chloropolycarbosilane prepared by the process of claim 1.

6. A crosslinked chloropolycarbosilane containing units of the formula

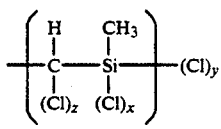

wherein x, y, and z represent the proportion of bonds occupied by Cl, $0 \leq x < 1$, $0 \leq y < 1$, and $0 \leq z < 0.4$.

7. A process for preparing a crosslinked polycarbosilane which comprises the steps of:
preparing a crosslinked chloropolycarbosilane by the process of claim 1; and
reducing said chloropolycarbosilane at a temperature from <10° C. to 25° C.

8. The process of claim 7 wherein the crosslinked chloropolycarbosilane contains units of the formula

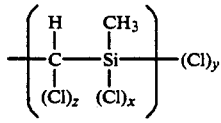

wherein x, y, and z represent the proportion of bonds occupied by Cl, $0 \leq x < 1$, $0 \leq y < 1$, and $0 \leq z < 0.4$; and wherein the crosslinked polycarbosilane has the formula

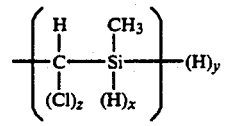

wherein x and y represent the proportion of bonds occupied by H, z represents the proportion of bonds occupied by Cl, $0 \leq x < 1$, $0 \leq y < 1$, and $0 \leq z < 0.4$.

9. The process of claim 7 wherein the metal is Mg and the solvent is tetrahydrofuran.

10. A crosslinked polycarbosilane prepared by the process of claim 7.

11. A crosslinked polycarbosilane containing units of the formula

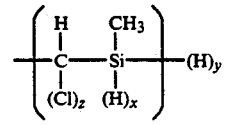

wherein x and Y represent the proportion of bonds occupied by H, z represents the proportion of bonds occupied by Cl, $0 \leq x < 1$, $0 \leq y < 1$, and $0 \leq z < 0.4$.

12. A process for preparing a silicon carbide which comprises the steps of: preparing a crosslinked polycarbosilane by the process of claim 7; and pyrolyzing said polycarbosilane.

13. The process of claim 12 wherein the crosslinked chloropolycarbosilane contains units of the formula

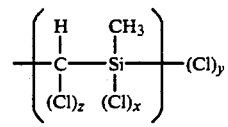

wherein x, y, and z represent the proportion of bonds occupied by Cl, $0 \leq x < 1$, $0 \leq y < 1$, and $0 \leq z < 0.4$; and wherein the crosslinked polycarbosilane has the formula

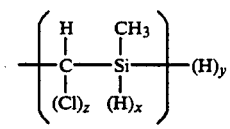

wherein x and y represent the proportion of bonds occupied by H, z represents the proportion of bonds occupied by Cl, $0 \leq x < 1$, $0 \leq y < 1$, and $0 \leq z < 0.4$.

14. The process of claim 13 wherein the metal is Mg and the solvent is tetrahydrofuran.

* * * * *